United States Patent
Eslami (10) Patent No.: US 10,356,410 B2
(45) Date of Patent: Jul. 16, 2019

(54) IMAGE PROCESSING SYSTEM WITH JOINT ENCODING AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 14/526,120

(22) Filed: Oct. 28, 2014

(65) Prior Publication Data
US 2016/0119637 A1    Apr. 28, 2016

(51) Int. Cl.
| | |
|---|---|
| *H04N 19/44* | (2014.01) |
| *H04N 19/40* | (2014.01) |
| *H04N 19/635* | (2014.01) |
| *H04N 19/34* | (2014.01) |
| *H04N 19/129* | (2014.01) |
| *H04N 19/186* | (2014.01) |
| *H04N 19/18* | (2014.01) |
| *H04N 19/184* | (2014.01) |
| *H04N 19/645* | (2014.01) |

(52) U.S. Cl.
CPC ........... *H04N 19/129* (2014.11); *H04N 19/18* (2014.11); *H04N 19/184* (2014.11); *H04N 19/186* (2014.11); *H04N 19/645* (2014.11)

(58) Field of Classification Search
CPC ........ H04N 19/45; H04N 19/34; H04N 19/40; H04N 19/635
See application file for complete search history.

(56) References Cited

U.S. PATENT DOCUMENTS

| | | | |
|---|---|---|---|
| 6,154,493 | A | 11/2000 | Acharya et al. |
| 6,272,180 | B1 | 8/2001 | Lei |
| 6,356,665 | B1 | 3/2002 | Lei et al. |
| 6,546,143 | B1 | 4/2003 | Taubman et al. |
| 6,549,666 | B1 | 4/2003 | Schwartz |
| 6,801,665 | B1 | 10/2004 | Atsumi et al. |

(Continued)

FOREIGN PATENT DOCUMENTS

WO    WO-2000049571 A2    8/2000

OTHER PUBLICATIONS

U.S. Appl. No. 14/525,364, filed Oct. 28, 2014, Eslami.
(Continued)

*Primary Examiner* — Mainul Hasan
(74) *Attorney, Agent, or Firm* — Haverstock & Owens LLP (57) ABSTRACT

An image processing system, and a method of operation thereof, including: a capture device for obtaining an input image block; and an image signal processing hardware including: a wavelet transform module for generating a transformed image block based on the input image block, the transformed image block having wavelet coefficients, a coding module including a scaling correction module for organizing binary values of the wavelet coefficients into bitplanes and for generating a scaled wavelet block with a scaling factor, the coding module for generating a compressed image block by scanning and coding the bitplanes of the scaled wavelet block, and a decoding module and an inverse wavelet transform module for generating an output image block by decoding, rescaling, and performing an inverse wavelet transform on the compressed image block for display on a display device.

18 Claims, 8 Drawing Sheets

(56) References Cited

U.S. PATENT DOCUMENTS

| | | |
|---|---|---|
| 6,865,291 B1 | 3/2005 | Zador |
| 6,965,700 B2 | 11/2005 | Pearlman et al. |
| 7,006,697 B1 | 2/2006 | Gormish et al. |
| 7,120,307 B2 | 10/2006 | Malvar |
| 7,142,722 B2 | 11/2006 | Fukuhara et al. |
| 7,248,735 B2 | 7/2007 | Funakubo |
| 7,308,402 B2 | 12/2007 | Zhou et al. |
| 7,315,651 B2 | 1/2008 | Sakuyama et al. |
| 7,376,279 B2 | 5/2008 | Dekel et al. |
| 7,397,963 B2 | 7/2008 | Schwartz |
| 7,412,102 B2 | 8/2008 | Srinivasan et al. |
| 7,421,137 B2 | 9/2008 | Taubman |
| 7,454,074 B2 | 11/2008 | Dekel et al. |
| 7,492,955 B2 | 2/2009 | Zandi et al. |
| 7,545,988 B2 | 6/2009 | Meeker |
| 7,574,056 B2 | 8/2009 | Funakubo et al. |
| 7,623,577 B2 | 11/2009 | Kim et al. |
| 7,634,145 B2 | 12/2009 | Keith et al. |
| 7,656,561 B2 | 2/2010 | Molgaard et al. |
| 7,949,044 B2 | 5/2011 | Winger et al. |
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2001/0003544 A1* | 6/2001 | Kajiwara ............... H04N 19/70 382/240 |
| 2001/0024530 A1 | 9/2001 | Fukuhara et al. |
| 2002/0003905 A1 | 1/2002 | Sato et al. |
| 2002/0118759 A1* | 8/2002 | Enficiaud ............... H04N 19/70 375/240.19 |
| 2003/0063809 A1 | 4/2003 | Andrew |
| 2003/0123742 A1 | 7/2003 | Zhao et al. |
| 2003/0190042 A1 | 10/2003 | Tagashira et al. |
| 2005/0094883 A1* | 5/2005 | Malvar ................... H03M 7/40 382/240 |
| 2005/0131660 A1 | 6/2005 | Yadegar et al. |
| 2006/0034525 A1 | 2/2006 | Sakai |
| 2006/0159355 A1* | 7/2006 | Mizuno ................ H04N 19/147 382/239 |
| 2008/0253463 A1 | 10/2008 | Lin et al. |
| 2010/0046628 A1 | 2/2010 | Bhaskaran et al. |
| 2010/0085224 A1 | 4/2010 | Monro |
| 2011/0229047 A1 | 9/2011 | Shimauchi et al. |
| 2011/0292247 A1 | 12/2011 | Gharavi-Alkhansari et al. |
| 2012/0200669 A1 | 8/2012 | Lai et al. |
| 2012/0307904 A1 | 12/2012 | Yi et al. |
| 2014/0169693 A1 | 6/2014 | Kuo et al. |

OTHER PUBLICATIONS

U.S. Appl. No. 14/525,474, filed Oct. 28, 2014, Eslami.
U.S. Appl. No. 14/525,524, filed Oct. 28, 2014, Eslami.
U.S. Appl. No. 14/525,556, filed Oct. 28, 2014, Eslami.
U.S. Appl. No. 14/525,611, filed Oct. 28, 2014, Eslami.
U.S. Appl. No. 14/525,657, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

IMAGE PROCESSING SYSTEM WITH JOINT ENCODING AND METHOD OF OPERATION THEREOF

CROSS-REFERENCE TO RELATED APPLICATION(S)

The present application contains subject matter related to a concurrently filed U.S. patent application by Ramin Eslami entitled "IMAGE PROCESSING SYSTEM WITH BIT-STREAM REDUCTION AND METHOD OF OPERATION THEREOF". The related application is assigned to Sony Corporation and is identified as U.S. patent application Ser. No. 14/525,364, filed Oct. 28, 2014 (now U.S. Pat. No. 9,357,237). The subject matter thereof is incorporated herein by reference thereto.

The present application contains subject matter related to a concurrently filed U.S. patent application by Ramin Eslami entitled "IMAGE PROCESSING SYSTEM WITH BINARY DECOMPOSITION AND METHOD OF OPERATION THEREOF". The related application is assigned to Sony Corporation and is identified as U.S. patent application Ser. No. 14/525,474, filed Oct. 28, 2014 (now U.S. Pat. No. 9,357,232). The subject matter thereof is incorporated herein by reference thereto.

The present application contains subject matter related to a concurrently filed U.S. patent application by Ramin Eslami entitled "IMAGE PROCESSING SYSTEM WITH ARTIFACT REDUCTION MECHANISM AND METHOD OF OPERATION THEREOF". The related application is assigned to Sony Corporation and is identified as U.S. patent application Ser. No. 14/525,524, filed Oct. 28, 2014 (now U.S. Pat. No. 9,294,782). The subject matter thereof is incorporated herein by reference thereto.

The present application contains subject matter related to a concurrently filed U.S. patent application by Ramin Eslami entitled "IMAGE PROCESSING SYSTEM WITH CODING MODE AND METHOD OF OPERATION THEREOF". The related application is assigned to Sony Corporation and is identified as U.S. patent application Ser. No. 14/525,556, filed Oct. 28, 2014 (now U.S. Pat. No. 9,674,554). The subject matter thereof is incorporated herein by reference thereto.

The present application contains subject matter related to a concurrently filed U.S. patent application by Ramin Eslami entitled "IMAGE PROCESSING SYSTEM WITH CONDITIONAL CODING AND METHOD OF OPERATION THEREOF". The related application is assigned to Sony Corporation and is identified as U.S. patent application Ser. No. 14/525,611, filed Oct. 28, 2014 (now U.S. Pat. No. 10,063,889). The subject matter thereof is incorporated herein by reference thereto.

The present application contains subject matter related to a concurrently filed U.S. patent application by Ramin Eslami entitled "IMAGE PROCESSING SYSTEM WITH BINARY ADAPTIVE GOLOMB CODING AND METHOD OF OPERATION THEREOF". The related application is assigned to Sony Corporation and is identified as U.S. patent application Ser. No. 14/525,657, filed Oct. 28, 2014 (now U.S. Pat. No. 9,591,330). The subject matter thereof is incorporated herein by reference thereto.

TECHNICAL FIELD

The embodiments of the present invention relate generally to an image processing system, and more particularly to a system for joint coding of color components.

BACKGROUND ART

Existing data networks experience ever-increasing demands on them due to the proliferation of embedded, mobile, and otherwise internet-connected devices. The rapid increase of mobile devices has also placed great demands on wireless data networks. A large part of this increased demand is due to streaming audio or video.

Streaming video places heavy demands on available bandwidth due to the high volume of data required. Thus, compression of video or audio data becomes necessary. Many different data compression codecs (coder-decoder) for audio and video exist, with various levels of efficiency. However, not all codecs are equally efficient, and as wireless networks get more congested, and data usage caps become more common, continuous improvement in compression ratios, especially for streaming and on-demand video, is desired.

Thus, a need still remains for a better encoding method. In view of the rapid rise in the consumption of on-demand video, it is increasingly critical that answers be found to these problems. Growing consumer expectations and diminishing opportunities for meaningful product differentiation in the marketplace make it critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system of an image processing system that includes obtaining an input image block with a capture device; generating a transformed image block based on the input image block, the transformed image block having wavelet coefficients and a low pass subband and a coarsest high pass subband of the wavelet coefficients; organizing binary values of the wavelet coefficients into bitplanes each with a bitplane priority value; generating a scaled wavelet block by increasing the bitplane priority value for the bitplanes of the low pass subband and the coarsest high pass subband of the wavelet coefficients with a scaling factor; generating a compressed image block by scanning and coding the bitplanes of the scaled wavelet block; and generating an output image block by decoding, rescaling, and performing an inverse wavelet transform on the compressed image block for display on a display device.

The present invention provides an image processing system that includes a capture device for obtaining an input image block; and an image signal processing hardware coupled to the capture device, the image signal processing hardware including: a wavelet transform module for generating a transformed image block based on the input image block, the transformed image block having wavelet coefficients and a low pass subband and a coarsest high pass subband of the wavelet coefficients, a coding module coupled to the wavelet transform module including a scaling correction module for organizing binary values of the wavelet coefficients into bitplanes each with a bitplane priority value and for generating a scaled wavelet block by increasing the bitplane priority value for the bitplanes of the low pass subband and the coarsest high pass subband of the wavelet coefficients with a scaling factor, the coding module for generating a compressed image block by scanning and coding the bitplanes of the scaled wavelet block, and a decoding module and an inverse wavelet transform module coupled to the coding module for generating an output image block by decoding, resealing, and performing an inverse wavelet transform on the compressed image block for display on a display device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGS. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, dedicated circuitry for a specific function, a processor, a computer, an integrated circuit, integrated circuit cores, a microelectromechanical system (MEMS), passive devices, environmental sensors including temperature sensors, or a combination thereof.

Figure 1:
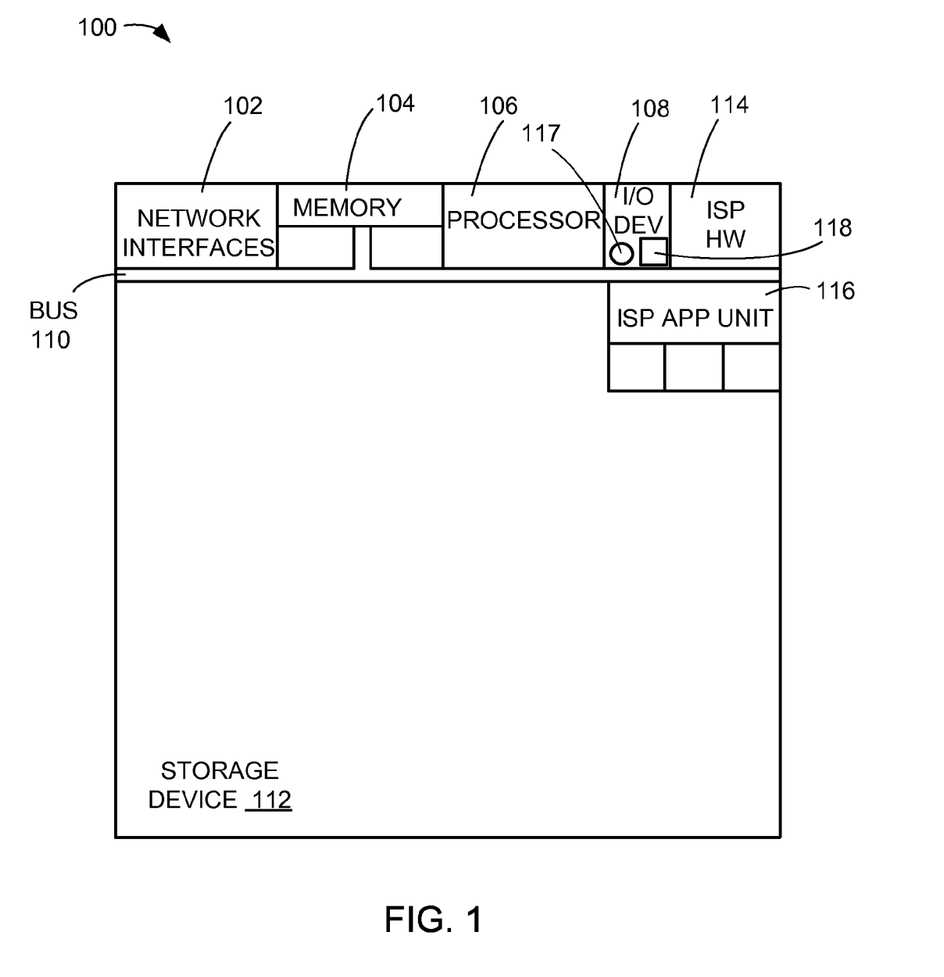
FIG. 1 is an example of a block diagram of an image processing system with joint encoding in a first embodiment of the present invention.

Referring now to FIG. 1, therein is shown an example of a block diagram of an image processing system 100 with joint encoding in a first embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-Shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projection, CRT, or other display technologies.

The video captured by the capture device 117 can be considered as a series of images which can further be broken down into input image blocks, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns. For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118 which can display resulting video.

Regardless of how the capture device 117, the processor 106, and the display devices 118 are connected, the display devices 118 can output decoded image blocks as decoded video after processing of the input image blocks by the image signal processing hardware 114. The quality of the resulting video can be determined by the particular compression scheme used when transmitting image block data, for example.

Figure 2:
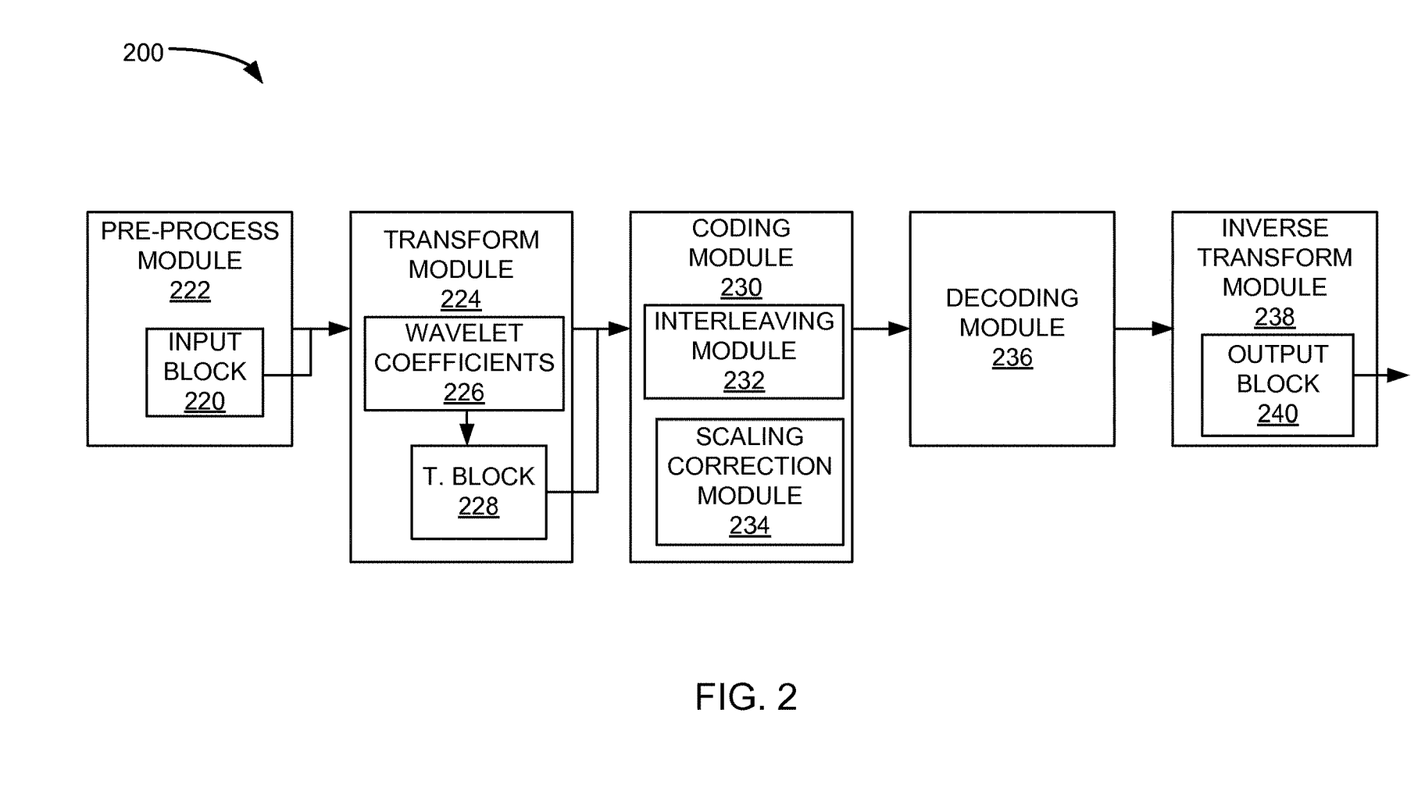
FIG. 2 is a system diagram of the image processing system in a second embodiment of the present invention.

Referring now to FIG. 2, therein is shown a system diagram of the image processing system 200 in a second embodiment of the present invention. In this embodiment, images or video are handled at the level of image blocks, which are selected portions of the images or video. An input image block 220 is generated from image information captured by the capture device 117 of FIG. 1. For example, the input image block 220 can be generated by taking a set number of pixels from the captured image information at regular intervals to cover all portions of the image information.

In this example, processing of the input image block 220 takes place in the image signal processing hardware 114 and in various processing subunits of the image signal processing hardware 114. For example, the processing subunits or modules which perform specific functions can be hardware subunits, dedicated circuitry, or modules within the image signal processing hardware 114.

A pre-processing module 222 can generate the input image block 220 where the pixels of the input image block 220 are assigned numbers and arranged in order in what is sometimes called a one-dimensional image block. The one-dimensional image block will be described in greater detail in later figures. For example, the one-dimensional image block can be formed from 32 or 64 pixels. The color components of the pixels can be used to create separate but related instances of the input image block 220. For example, in a YUV 422 formatted image, separate image blocks can contain data for the Y (or luma) channel, the U channel, or V channel (U and V are also considered the chroma channels). The input image block 220 can contain data from one or more of the channels; for example, the input image block 220 can contain only Y channel information. The pre-processing module 222 allows for easier and faster processing in later steps.

The pre-processing module 222 is coupled to a wavelet transform module 224, which transforms the visual data in the pixels of the input image block 220 into wavelet coefficients 226 which can be used to create a transformed image block 228. In order to have the transformation be reversible, integer wavelet coefficients can be used, for example. It has been found that this allows for error-free wavelet transformation and for the ability to perform simple integer-based calculations, which simplifies calculations and allows for a reduction in hardware cost. The wavelet transform module 224 can also perform a decomposition step to generate various high pass and low pass subbands within the ordered list of the wavelet coefficients 226. An example of the transformed image block 228 with three subband levels can be seen in FIG. 3.

The wavelet transform module 224 is coupled to a coding module 230, which can also be considered as a compression module. The coding module 230 can act on the wavelet coefficients 226. The coding module 230 can contain two submodules; an interleaving module 232 and a scaling correction module 234. Interleaving helps to reduce the complexity of the coder by reducing the number of components from 3 to 2. Furthermore, in situations where sampling of color component values is done on an unequal basis, it has been found to be helpful to interleave smaller blocks to equal the size of larger blocks. For example, in YUV 422 images, Y values are sampled twice as often as U and V values; this means that there will be twice as many of the wavelet coefficients 226 for Y as for U or V individually. Thus, the interleaving module 232 can interleave the wavelet coefficients from U and V image blocks in order to generate a transformed and interleaved image block with combined U and V information that is the same size as the transformed image block 228 which contains Y information, for example.

The values of each of the wavelet coefficients 226 can be expressed as binary values, or bits. The binary values can be of the absolute value of the wavelet coefficients 226, with information regarding positive or negative signs recorded in separate bits, for example. The bits can be organized into an array with the most significant bits at the top of the array, with less significant bits listed in decreasing priority when going down the array. The array can be subdivided into bitplanes of various significance, with the most significant of the bitplanes at the top of the array. An example of the bitplanes of the wavelet coefficients 226 can be seen in FIG. 4.

The scaling correction module 234 can adjust priorities of the various subbands of the wavelet coefficients 226 within the transformed image block 228 in order to ensure proper scaling of the wavelet coefficients 226. This can have the effect of creating scaled bitplanes which can create higher priority bitplanes than previously existed. The functions of the submodules will be described in greater detail in later figures.

The coding module 230 can be coupled to a decoding module 236, which reverses the operations of the coding module 230 to decompress a compressed image block (the data) sent from the coding module 230 to the decoding module 236. An inverse wavelet transform module 238 can reverse the operations of the wavelet transform module 224 and generate an output image block 240. The output image block 240 can then be displayed on the display devices 118 of FIG. 1. Post processing can be done on the output image block 240 before display as necessary, for example.

Figure 3:
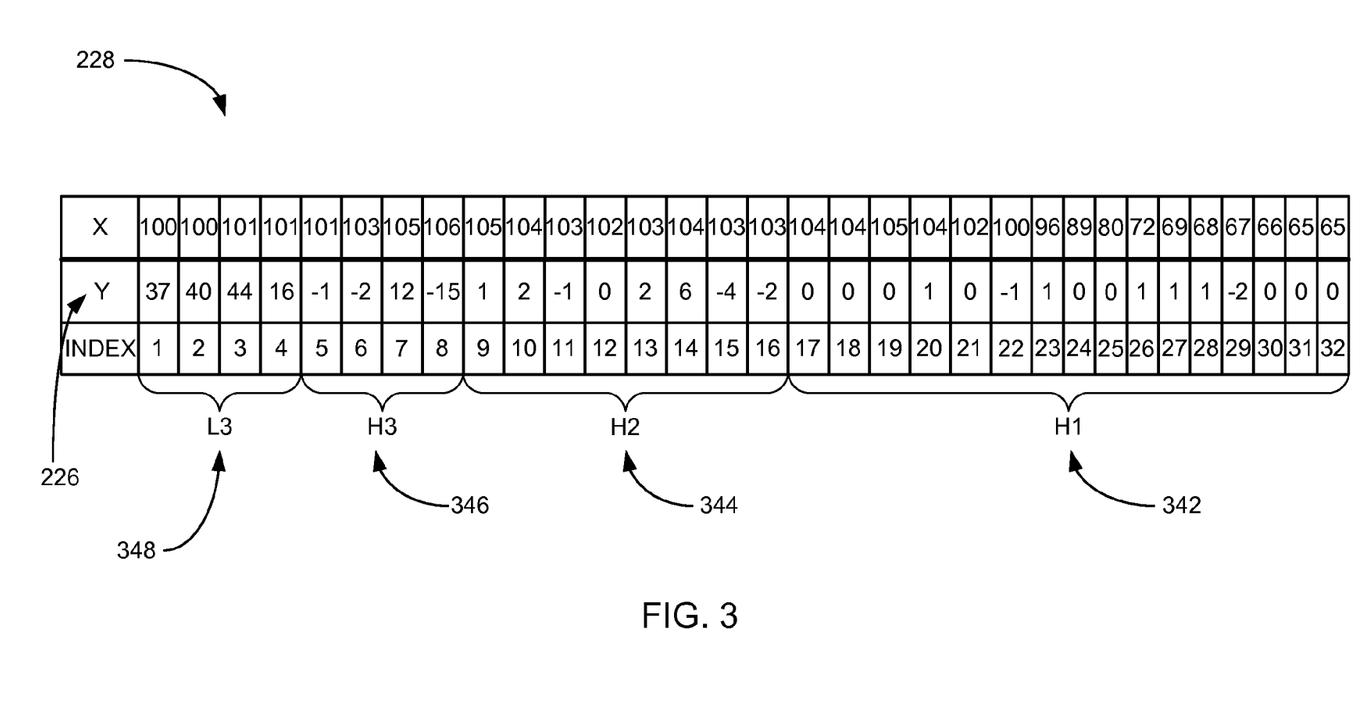
FIG. 3 is an example of the transformed image block of FIG. 2.

Referring now to FIG. 3, therein is shown an example of the transformed image block 228 of FIG. 2. It is understood that the numbers are for illustrative purposes only, and that parameters of the transformed image block 228 can be modified. For example, while the block size of the transformed image block 228 shown is 32×1 (nominally pixels), it is understood that the block size can be different such as 64×1 or other size as required by the situation. Also, the number of wavelet levels that are used in this example is three (l=3), but it can be four (l=4), especially for larger block sizes. The wavelet decomposition can result in the wavelet coefficients 226 being broken up into three or four dyadic wavelet levels; in other words, three dyadic wavelet levels is the same as l=3, and is interchangeable with the term three wavelet levels. Also for example, four dyadic wavelet levels is the same as l=4 and is interchangeable with the term four wavelet levels.

In this example, the transformed image block 228 is the luma, or Y component of the visual data. The letter x denotes the intensity value of each pixel within a 0-255 scale, as an example. The letter y designates the wavelet coefficients 226 as determined by the wavelet transform module 224 of FIG. 2. In this example, integer wavelet coefficients are used so a reverse transform is possible. The index number is a way of tracking the wavelet coefficients 226.

Also shown in this figure are the results of cascading signal decomposition. A level one high pass subband 342 is the result of the first decomposition, and is noted by H1. A level two high pass subband 344 is the result of a second decomposition step, and is noted by H2. A level three high pass subband 346 is the result of a third decomposition, and is noted by H3. Here H1 can also be called the finest high pass subband and H3 the coarsest high pass subband. A low pass subband 348 is noted by L3, and is the same size as the level three high pass subband 346 as well as being a result of the third decomposition. The particular decomposition pattern which uses three (l=3) wavelet levels is for example only, and it is understood that other types of signal decomposition are possible. For example, if four wavelet levels are used (l=4), L3 is further decomposed into H4 and L4. At this case, H4 will be the coarsest high pass subband.

Figure 4:
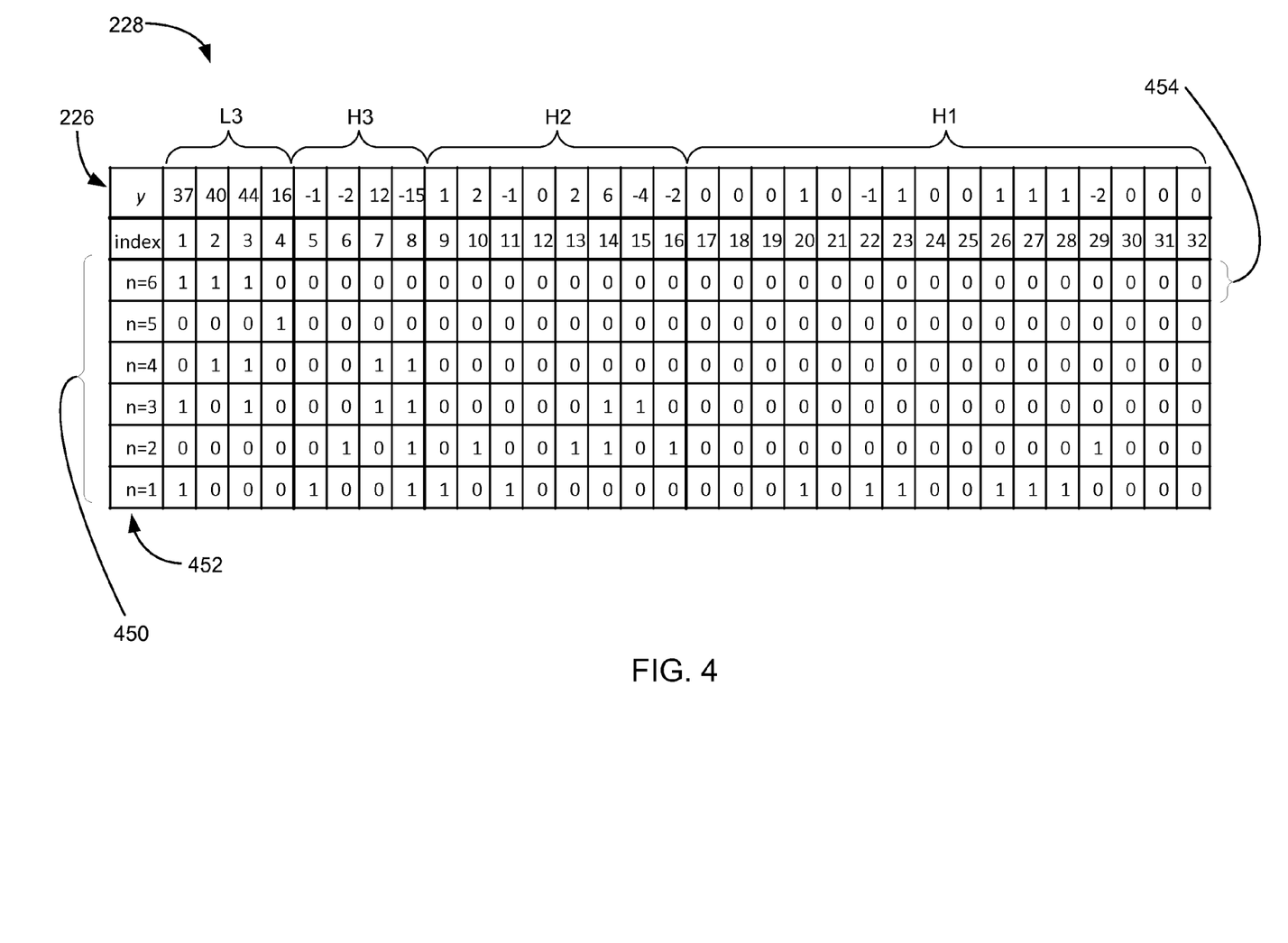
FIG. 4 is an example of the bitplanes of the wavelet coefficients of FIGS. 2 and 3.

Referring now to FIG. 4, therein is shown an example of the bitplanes of the wavelet coefficients 226 of FIGS. 2 and 3. This can be considered as an expanded view of the transformed image block 228, which is the input image block 220 of FIG. 2 after going through the wavelet transform module 224 of FIG. 2. As with FIG. 3, the values are for example only. In this example, the index numbers and the wavelet coefficients 226 are shown above bitplanes 450 of the wavelet coefficients 226. The bitplanes 450 are defined as the horizontal rows of bits which represent a portion of the value of the wavelet coefficients 226. In this example, below each of the wavelet coefficients 226 is the binary representation of the value of the wavelet coefficients 226, read from the top to the bottom; for example, the binary value below the wavelet coefficient of 37 corresponding to index number 1 can be read as 100101, which is the binary representation of the number 37.

The n value is a bitplane priority value 452, with lower numbers having lower priority. For example, a most significant bitplane 454 will have the highest value for the bitplane priority value 452; in this example, the most significant bitplane 454 is the horizontal row of bits with the bitplane priority value 452 of 6 (shown as n=6). In this example, this is because 6 bits are necessary to cover all of the existing wavelet coefficient values; it is understood that the number of the bitplanes 450 can change depending on the maximum value within of the wavelet coefficients 226.

Figure 5:
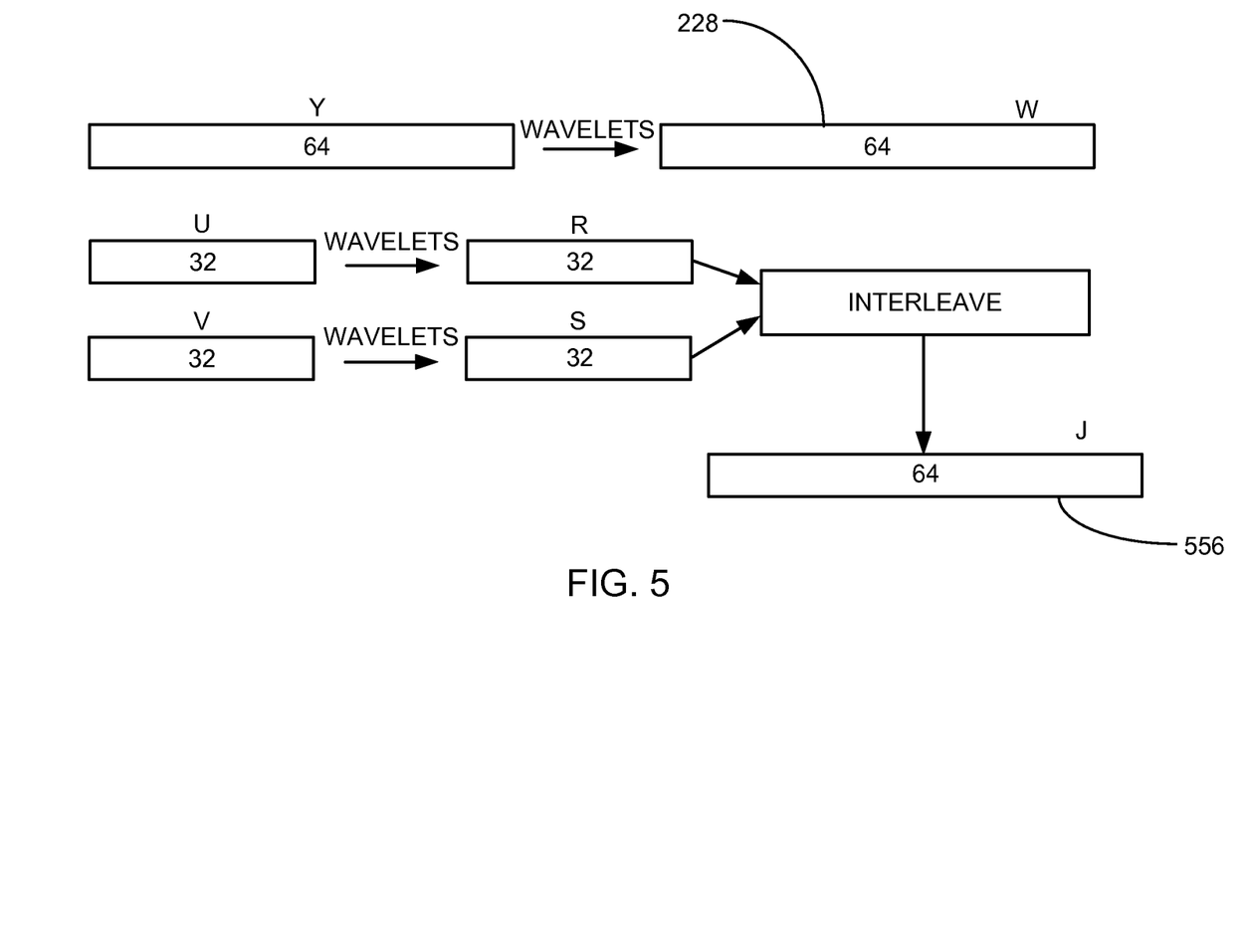
FIG. 5 is a flow diagram for an interleaving phase of operation.

Referring now to FIG. 5, therein is shown a flow diagram for an interleaving phase of operation. Shown in the figure are color components of a YUV 422 image, which is used for illustrative purposes only. The figure also shows an example of interleaving using a 64×1 one-dimensional image block (earlier examples used 32×1 pixel image blocks, but the image block sizes are for example only; the process can be adapted for image blocks of any size).

When using a 64×1 pixel image block, there are 64 intensity values, or samples of Y values (luma values). Because the example uses a YUV 422 image, there are only half as many samples of U and V values (chroma values)—32 samples each of U and V values. After the wavelet coefficients 226 of FIG. 2 have been generated, the transformed image block 228 containing the transformed Y values is Ruined. The transformed image block 228 is formed for each of the U and V input image blocks as well using the wavelet coefficients 226 of the respective blocks.

As can be seen in FIG. 5, there is a mismatch in block size of the transformed image block 228 of Y (noted with W) and of U and V (noted with R and S, respectively). A transformed and interleaved image block 556 can be formed from R and S by interleaving the wavelet coefficients 226 of R and S in order. For example, the first wavelet coefficient of R can be followed by the first wavelet coefficient of S. Continuing the example, the second wavelet coefficient of R can be followed by the second coefficient of S. The pattern continues until all of the wavelet coefficients 226 have been interleaved to form the transformed and interleaved image block 556 (noted with J). The block size of J is now equal to the block size of W.

It has been discovered that matching the block sizes of the transformed image block 228 and the transformed and interleaved image block 556 improves processing speed and lowers hardware cost. Because the transformed block sizes are the same, implementing the necessary operations to later compress the transformed image block 228 and the transformed and interleaved image block 556 is simplified as the same circuitry can be used to operate on both, rather than making more complex circuitry necessary. Further, because the block size becomes invariant, processing speed can be improved.

It has also been discovered that matching the block sizes of the transformed image block 228 and the transformed and interleaved image block 556 through interleaving smaller blocks as necessary balances the quality of color components in the final image. This results in better final image quality because the luma (block W) and chroma (block J) components of the image block are treated the same due to their equal size. In addition, using the kind of joint coding described above can also allow for higher image quality without increasing the memory or bus bandwidth required.

Figure 6:
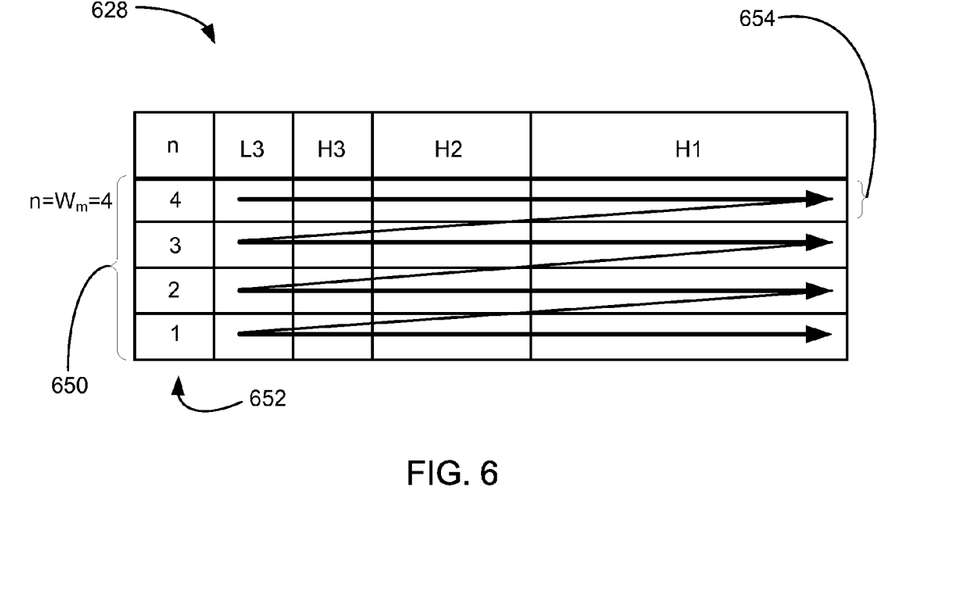
FIG. 6 is an example of a regular coefficient scan of the transformed image block.

Referring now to FIG. 6, therein is shown an example of a regular coefficient scan of the transformed image block 628. For simplicity and for illustrative purposes, the transformed image block 628 is shown with 4 of bitplanes 650 rather than 6 as in FIG. 4. Further, the wavelet coefficients 226 of FIG. 4 from which the bitplanes 650 are derived have been removed for the sake of simplicity. The principles introduced in the following figure will still apply, as the number of the bitplanes 650 is not as important as the relative positions of the bitplanes 650.

In a regular scan of the bitplanes 650, the scan for compression purposes will start from the first bit (generally index number 1) of a most significant bitplane 654 and scan in order across the most significant bitplane 654 (noted in this example with $n=W_m=4$). Once the end of the most significant bitplane 654 is reached, the scan continues from the first bit of the next bitplane having a bitplane priority value 652 which is one less than the most significant bitplane 654 (in this example, the bitplane priority value 652 would be $n=3$). This pattern continues until all bits have been scanned or until the bitbudget is reached.

Figure 7:
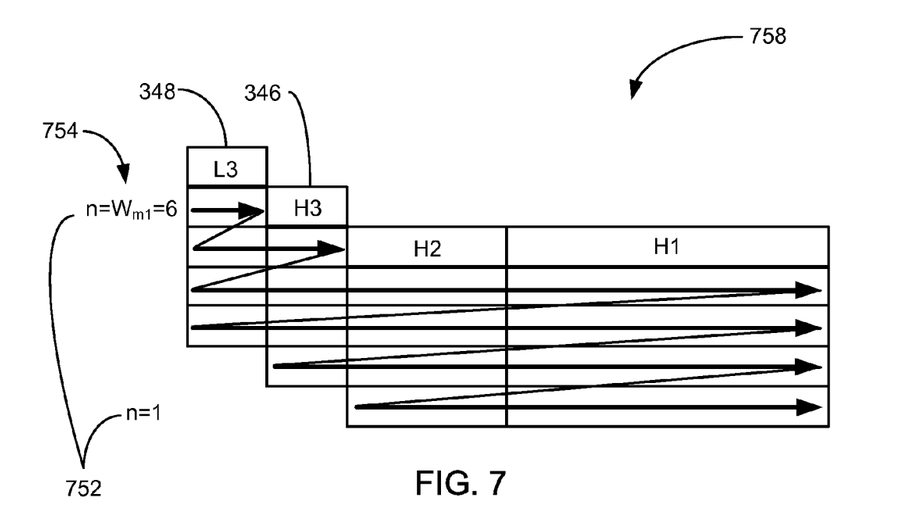
FIG. 7 is an example of the block of FIG. 6 which has undergone type I scaling.

Referring now to FIG. 7, therein is shown an example of the block of FIG. 6 which has undergone type I scaling. This type of scaling has been found to be most effective for the transformed image block 228 (block W, for example) of FIG. 5. That is, for scaling of luma wavelet coefficient values, this type of scaling is effective. The scaling can be performed by the scaling correction module 234 of FIG. 2 which can then output a scaled wavelet block 758 for scanning and coding in the coding module 230 of FIG. 2.

When using wavelet coefficients, normal scaling results in non-integer values. In order to have reversible wavelet compression, integer-based wavelets are required. This results in the use of a scaling factor of 1 rather than typical scaling factors; for example, low pass wavelet coefficients can be scaled by the square root of 2, and high pass coefficients could be scaled by 1 over the square root of 2. To have integer-based (reversible) wavelets, the scaling factor of 1 will be used for all of the wavelet coefficients 226 of FIG. 2.

However, when the scaling factor is changed, the quality of the image blocks after decompression is decreased. For example, the peak signal-to-noise ratio (PSNR) can indicate a decrease in quality. One solution to this problem is to modify scaling of particular wavelet subbands. For example, the wavelet coefficients 226 in the low pass subband 348 can be multiplied by 4, and the wavelet coefficients 226 in the level three high pass subband 346 (the coarsest high pass subband in this example) can be multiplied by 2. For this example where three ($l=3$) wavelet levels are used, the coarsest high pass subband corresponds to the level three high pass subband 346. If four ($l=4$) wavelet levels were used, the coarsest high pass subband would correspond to a level four high pass subband. The result of this multiplication is to "shift" the binary values in the low pass subband 348 and the level three high pass subband 346 up by two bitplanes and one bitplane, respectively, as can be seen in the figure. This increases a bitplane priority value 752 (shown as $n=$<a number>) of a most significant bitplane 754 (represented in this example as $n=W_{m1}=6$ where $W_{m1}$ represents the most significant bitplane 754) to 6, from a previous value of 4, which can be seen in FIG. 6. This can complete the generation of the scaled wavelet block 758.

Due to the increase in the bitplane priority value 752 for the low pass subband 348 and the level three high pass subband 346, the scan order when performing coding or compression is modified as can be seen in the figure. For example, because all bitplanes of the low pass subband 348 have had the bitplane priority value 752 increased by two bitplanes, the bits of the wavelet coefficients 226 of the low pass subband 348 will be scanned earlier than otherwise. The arrows indicate the new scan order. It is important to note that because only some of the wavelet subbands have been shifted, the bitplane priority value 752 may only have one or two subbands rather than all of them. In this example, when the bitplane priority value=6, there are only the bits of the most significant bitplane 754 of the wavelet coefficients 226 in the low pass subband 348.

It has been discovered that increasing the bitplane priority value 752 of selected wavelet subbands largely restores preferred scaling without affecting reversibility of the integer wavelet transform. Because replacing standard scaling factors with a scaling factor of 1 reduces quality due to improper scaling of the wavelet coefficients 226, increasing the bitplane priority value 752 of certain wavelet subbands such as the low pass subband 348 and the level three high pass subband 346 (the coarsest high pass subband in this example) can allow for the adjusted scan order to more closely match the scan order one would see in a preferred scaling scheme.

Figure 8:
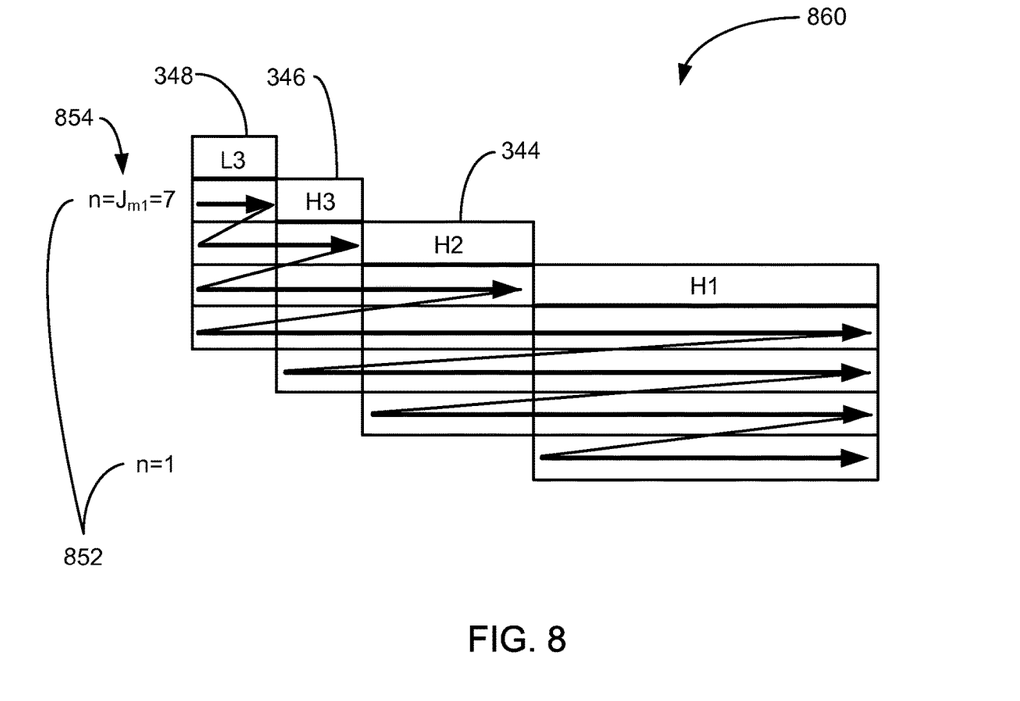
FIG. 8 is an example of the scan of FIG. 6 which has undergone type II scaling.

Referring now to FIG. 8, therein is shown an example of the scan of FIG. 6 which has undergone type II scaling. This type of scaling has been found to be most effective for the transformed and interleaved image block 556 (block J, for example) of FIG. 5. That is, for scaling of interleaved chroma wavelet coefficient values, this type of scaling is effective. The scaling can be performed by the scaling correction module 234 of FIG. 2 which can then output a scaled and interleaved image block 860 for scanning and coding in the coding module 230 of FIG. 2.

When using wavelet coefficients, normal scaling results in non-integer values. In order to have reversible wavelet compression, integer-based wavelets are required. This results in the use of a scaling factor of 1 rather than typical scaling factors; for example, low pass wavelet coefficients can be scaled by the square root of 2, and high pass coefficients could be scaled by 1 over the square root of 2 at each wavelet level. To have integer-based (reversible) wavelets, the scaling factor of 1 will be used for all of the wavelet coefficients 226 of FIG. 2.

However, when the scaling factor is changed, the quality of the image blocks after decompression is decreased. For example, the peak signal-to-noise ratio (PSNR) can indicate a decrease in quality. One solution to this problem is to modify scaling of particular wavelet subbands. For example, the wavelet coefficients 226 in the low pass subband 348 can be multiplied by 8, the wavelet coefficients 226 in the level three high pass subband 346 (the coarsest high pass subband in this example) can be multiplied by 4, and the wavelet coefficients 226 in the level two high pass subband 344 (or second coarsest high pass subband in this example) can be multiplied by 2. If, for example, four ($l=4$) wavelet levels were used, the coarsest high pass subband would correspond to a level four high pass subband and the second coarsest high pass subband would correspond to a level three high pass subband. The result of this multiplication is to "shift" the binary values in the low pass subband 348, the level three high pass subband 346 (the coarsest high pass subband), and the level two high pass subband 344 (the second coarsest high pass subband) up by three bitplanes, two bitplanes, and one bitplane, respectively, as can be seen in the figure. This increases a bitplane priority value 852 (shown as $n=$<a number>) of a most significant bitplane 854 (represented in this example as $n=J_{m1}=7$ where $J_{m1}$ represents the most significant bitplane 854—though not shown, prior to scaling the most significant bitplane 854 could be represented by n=$J_m$=4, for example) to 7, from a previous value of 4, which can be seen in FIG. 6. This can complete the generation of the scaled and interleaved image block 860.

Due to the increase in the bitplane priority value 852 for the low pass subband 348, the level three high pass subband 346 (the coarsest high pass subband in this example), and the level two high pass subband 344 (the second coarsest high pass subband in this example), the scan order when performing coding or compression is modified as can be seen in the figure. For example, because all bitplanes of the low pass subband 348 have had the bitplane priority value 852 increased by three bitplanes, the wavelet coefficients 226 of the low pass subband 348 will be scanned earlier than otherwise. The arrows indicate the new scan order. It is important to note that because only some of the wavelet subbands have been shifted, the bitplane priority value 852 may only have one or two subbands rather than all of them. In this example, when the bitplane priority value=7, there are only the wavelet coefficients 226 in the low pass subband 348.

The above example is for illustrative purposes only, and it is understood by one or ordinary skill in the art that the scaling process can be applied in a similar fashion to a four wavelet decomposition. For example, if there are four wavelet levels, the subbands shifted by the multiplication could be the low pass subband, the level four high pass subband, and the level three high pass subband.

It has been discovered that increasing the bitplane priority value 852 of selected wavelet subbands largely restores preferred scaling without sacrificing the reversibility of the integer wavelet transform. Because replacing standard scaling factors with a scaling factor of 1 reduces quality due to improper scaling of the wavelet coefficients 226, increasing the bitplane priority value 852 of certain wavelet subbands such as the low pass subband 348 and the level three high pass subband 346 can allow for the adjusted scan order to more closely match the scan order one would see in a preferred scaling scheme.

It has also been discovered that the lengths of the various subbands such as the low pass subband 348, the level three high pass subband 346, and the level two high pass subband 344 are the same length for the transformed and interleaved image block 556 and the transformed image block 228 of FIG. 5 because of the interleaving process. This similarity allows for greatly simplified hardware solutions to processing the wavelet coefficients 226 of each subband, which lowers hardware cost while also improving processing speed.

Careful examination of FIGS. 7 and 8 shows that scan patterns for luma and chroma are different. Because of this, a specific joint bitplane coding scan is necessary in order to balance the bits that are covered by each scan. The balancing is especially important when there is a limited bitbudget and not all bits can be scanned. The following method references FIGS. 7 and 8.

First, the three bitplanes with the highest value for the bitplane priority value 752 of FIG. 7 of the scaled wavelet block 758 of FIG. 7 can be scanned and coded (in this example, this is the bitplanes with the bitplane priority value 752 from n=6 to n=4; it can also be thought of as n=$W_{m1}$, $W_{m1}-1$, and $W_{m1}-2$). This can be followed by scanning and coding of the four bitplanes with the highest value for the bitplane priority value 852 of the scaled and interleaved image block 860 (in this example, this is the bitplanes with the bitplane priority value 852 from n=7 to n=4; this can also be thought of as n=$J_{m1}$, $J_{m1}-1$, $J_{m1}-2$, and $J_{m1}-3$).

Following the first two scanning and coding steps, the next most significant bitplane of the scaled wavelet block 758 can be scanned, followed by a scan of the next most significant bitplane of the scaled and interleaved image block 860. The scans of the bitplanes of the scaled wavelet block 758 and the scaled and interleaved image block 860 can be alternated in this pattern until all bitplanes are covered or until the bitbudget is reached. Once the scanning and coding are complete, this can generate a compressed image block. As a general example, the pseudo code shown in Algorithm 1 can be used for joint coding of W and J bitplanes:

---
Algorithm 1:
---

$T_m$ = max($W_m$,$J_m$);
for (n = $T_m$; n > 0; n--)
{
   if (n == $W_m$)
      scan and code W bitplanes n + 2,n + 1,and n.
   else if (n < $W_m$)
      scan and code W bitplane n.
   if (n == $J_m$)
      scan and code J bitplanes n + 3,n + 2,n + 1,and n.
   else if (n < $J_m$)
      scan and code J bitplane n.
}

---

Figure 9:
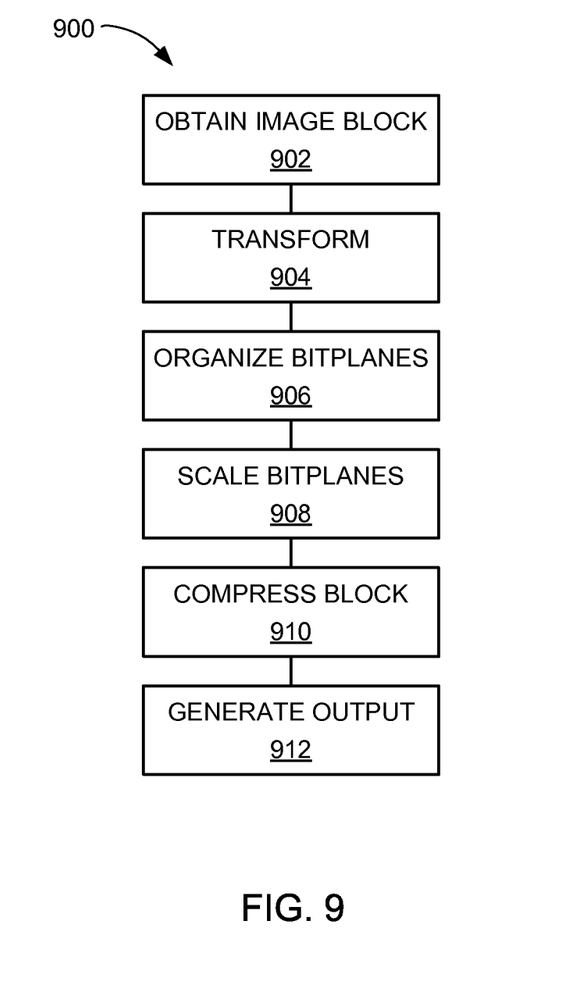
FIG. 9 is a flow chart of a method of operation of the image processing system in a further embodiment of the present invention.

Referring now to FIG. 9, therein is shown a flow chart of a method 900 of operation of an image processing system in a further embodiment of the present invention. The method 900 includes: obtaining an input image block with a capture device in a block 902; generating a transformed image block based on the input image block, the transformed image block having wavelet coefficients and a low pass subband and a coarsest high pass subband of the wavelet coefficients in a block 904; organizing binary values of the wavelet coefficients into bitplanes each with a bitplane priority value in a block 906; generating a scaled wavelet block by increasing the bitplane priority value for the bitplanes of the low pass subband and the coarsest high pass subband of the wavelet coefficients with a scaling factor in a block 908; generating a compressed image block by scanning and coding the bitplanes of the scaled wavelet block in a block 910; and generating an output image block by decoding, rescaling, and performing an inverse wavelet transform on the compressed image block for display on a display device in a block 912.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   obtaining an input image block with a capture device;
   generating a transformed image block based on the input image block, the transformed image block having wavelet coefficients and a low pass subband and a coarsest high pass subband of the wavelet coefficients;
   organizing binary values of the wavelet coefficients into bitplanes each with a bitplane priority value;
   generating a scaled wavelet block by increasing the bitplane priority value for the bitplanes of the low pass subband and the coarsest high pass subband of the wavelet coefficients with a scaling factor, wherein the wavelet coefficients of the low pass subband are multiplied by a first value, and the wavelet coefficients of the high pass subband are multiplied by a second value, wherein the first value is greater than the second value;
   generating a compressed image block by scanning and coding the bitplanes of the scaled wavelet block, wherein the scanning and coding continues until all bits have been scanned or a bit budget has been reached, further wherein scanning and coding includes scanning and coding three bitplanes with a highest value for a first bitplane priority value of the scaled wavelet block and four bitplanes with the highest value for a second bitplane priority value of a scaled and interleaved image block;
   generating an output image block by decoding, resealing, and performing an inverse wavelet transform on the compressed image block for display on a display device; and
   generating a transformed and interleaved image block based on the input image block and another input image block, the transformed and interleaved image block having the wavelet coefficients and the low pass subband and the coarsest high pass subband of the wavelet coefficients, wherein interleaving includes interleaving smaller blocks to equal a size of larger blocks.

2. The method as claimed in claim 1 wherein generating the transformed image block based on the input image block includes performing a cascading signal decomposition on the wavelet coefficients of the transformed image block.

3. The method as claimed in claim 1 wherein generating the compressed image block by scanning and coding the bitplanes of the scaled wavelet block includes:
   determining a most significant bitplane of the bitplanes of the wavelet coefficients;
   determining an index number of each of the wavelet coefficients; and
   starting the scanning and coding of the bitplanes from the most significant bitplane in order based on the index number of each of the wavelet coefficients.

4. The method as claimed in claim 1 wherein generating the transformed image block based on the input image block includes using an integer-based wavelet transform on the input image block.

5. A method of operation of an image processing system comprising:
   obtaining an input image block with a capture device;
   generating a transformed image block based on a luma component of the input image block, the transformed image block having wavelet coefficients and a low pass subband and a coarsest high pass subband of the wavelet coefficients;
   generating a transformed and interleaved image block based on two chroma components of the input image block, the transformed and interleaved image block having the wavelet coefficients and the low pass subband and the coarsest high pass subband of the wavelet coefficients;
   organizing binary values of the wavelet coefficients into bitplanes each with a bitplane priority value;
   generating a scaled wavelet block by increasing the bitplane priority value for the bitplanes of the low pass subband and the coarsest high pass subband of the wavelet coefficients of the transformed image block with a scaling factor, wherein the wavelet coefficients of the low pass subband are multiplied by a first value, and the wavelet coefficients of the high pass subband are multiplied by a second value, wherein the first value is greater than the second value, further wherein scanning and coding includes scanning and coding three bitplanes with a highest value for a first bitplane priority value of the scaled wavelet block and four bitplanes with the highest value for a second bitplane priority value of a scaled and interleaved image block;
   generating a scaled and interleaved image block by increasing the bitplane priority value for the bitplanes of the low pass subband and the coarsest high pass subband of the wavelet coefficients of the transformed and interleaved image block with another scaling factor, wherein interleaving includes interleaving smaller blocks to equal a size of larger blocks;
   generating a compressed image block by scanning and coding the bitplanes of the scaled wavelet block and the scaled and interleaved image block, wherein the scanning and coding continues until all bits have been scanned or a bit budget has been reached; and
   generating an output image block by decoding, resealing, and performing an inverse wavelet transform on the compressed image block for display on a display device.

6. The method as claimed in claim 5 wherein generating the transformed and interleaved image block based on the two chroma components of the input image block includes:
   generating the wavelet coefficients of a first chroma component of the input image block;
   generating the wavelet coefficients of a second chroma component of the input image block; and
   interleaving the wavelet coefficients of the two chroma components of the input image block for generating the transformed and interleaved image block.

7. The method as claimed in claim 5 wherein obtaining the input image block with the capture device includes:
   partitioning a set number of pixels from image information; and
   organizing the pixels into a one-dimensional image block.

8. The method as claimed in claim 5 wherein generating the scaled wavelet block includes:
   multiplying the low pass subband of the transformed image block by 4; and
   multiplying the coarsest high pass subband of the transformed image block by 2.

9. The method as claimed in claim 5 wherein generating a scaled and interleaved image block includes:
   multiplying the low pass subband of the transformed and interleaved image block by 8;

multiplying the coarsest high pass subband of the transformed and interleaved image block by 4; and multiplying a second coarsest high pass subband of the transformed and interleaved image block by 2.

10. An image processing system comprising:

a capture device for obtaining an input image block; and an image signal processing hardware coupled to the capture device, the image signal processing hardware including:

a wavelet transform module for generating a transformed image block based on the input image block, the transformed image block having wavelet coefficients and a low pass subband and a coarsest high pass subband of the wavelet coefficients, a coding module coupled to the wavelet transform module including a scaling correction module for organizing binary values of the wavelet coefficients into bitplanes each with a bitplane priority value and for generating a scaled wavelet block by increasing the bitplane priority value for the bitplanes of the low pass subband and the coarsest high pass subband of the wavelet coefficients with a scaling factor, the coding module for generating a compressed image block by scanning and coding the bitplanes of the scaled wavelet block, wherein the wavelet coefficients of the low pass subband are multiplied by a first value, and the wavelet coefficients of the high pass subband are multiplied by a second value, wherein the first value is greater than the second value, wherein the scanning and coding continues until all bits have been scanned or a bit budget has been reached, further wherein scanning and coding includes scanning and coding three bitplanes with a highest value for a first bitplane priority value of the scaled wavelet block and four bitplanes with the highest value for a second bitplane priority value of a scaled and interleaved image block, a decoding module and an inverse wavelet transform module coupled to the coding module for generating an output image block by decoding, rescaling, and performing an inverse wavelet transform on the compressed image block for display on a display device; and an interleaving module for generating a transformed and interleaved image block based on the input image block and another input image block, the transformed and interleaved image block having the wavelet coefficients and the low pass subband and the coarsest high pass subband of the wavelet coefficients, wherein interleaving includes interleaving smaller blocks to equal a size of larger blocks.

11. The system as claimed in claim 10 wherein the wavelet transform module is for generating the transformed image block based on the input image block includes performing a cascading signal decomposition on the wavelet coefficients of the transformed image block.

12. The system as claimed in claim 10 wherein the coding module is for:

determining a most significant bitplane of the bitplanes of the wavelet coefficients;

determining an index number of each of the wavelet coefficients; and starting the scanning and coding of the bitplanes from the most significant bitplane in order based on the index number of each of the wavelet coefficients.

13. The system as claimed in claim 10 wherein the wavelet transform module is for using an integer-based wavelet transform on the input image block.

14. The system as claimed in claim 10 further comprising:

an interleaving module for generating a transformed and interleaved image block based on the input image block and another input image block, the transformed and interleaved image block having the wavelet coefficients and the low pass subband and the coarsest high pass subband of the wavelet coefficients;

wherein:

the wavelet transform module is for using an integer-based wavelet transform on the input image block and for generating the transformed image block based on a luma component of the input image block and for generating the transformed and interleaved image block based on two chroma components of the input image block.

15. The system as claimed in claim 14 wherein:

the wavelet transform module is for:

generating the wavelet coefficients of a first chroma component of the input image block;

generating the wavelet coefficients of a second chroma component of the input image block; and the interleaving module is for:

interleaving the wavelet coefficients of the two chroma components of the input image block for generating the transformed and interleaved image block.

16. The system as claimed in claim 14 further comprising a pre-processing module coupled to the wavelet transform module for:

partitioning a set number of pixels from image information; and organizing the pixels into a one-dimensional image block.

17. The system as claimed in claim 14 wherein the scaling correction module is for:

multiplying the low pass subband of the transformed image block by 4; and multiplying the coarsest high pass subband of the transformed image block by 2.

18. The system as claimed in claim 14 wherein the scaling correction module is for:

multiplying the low pass subband of the transformed and interleaved image block by 8;

multiplying the coarsest high pass subband of the transformed and interleaved image block by 4; and multiplying a second coarsest high pass subband of the transformed and interleaved image block by 2.

\* \* \* \* \*